STRUCTURAL UNIT FOR STEEL FRAME BUILDINGS AND THE LIKE

Original Filed May 12, 1933 2 Sheets-Sheet 1

INVENTOR
Robert Edward McMillan
by Chas. W. Parker
Attorney

STRUCTURAL UNIT FOR STEEL FRAME BUILDINGS AND THE LIKE

Original Filed May 12, 1933 2 Sheets-Sheet 2

INVENTOR
Robert Edward McMillan
by Chas. H. Burke
atty

Reissued Jan. 17, 1939

Re. 20,980

UNITED STATES PATENT OFFICE 20,980

STRUCTURAL UNIT FOR STEEL FRAME BUILDINGS AND THE LIKE

Robert Edward McMillan, Marine Parade, Double Bay, New South Wales, Australia

Original No. 1,938,491, dated December 5, 1933, Serial No. 670,719½, May 12, 1933. In Australia May 11, 1932. Application for reissue March 18, 1938, Serial No. 196,803

4 Claims. (Cl. 72—61)

This invention relates to improvements in structural units for use in steel frame buildings or composite steel frame and bearing wall buildings and the like. It has been devised particularly for use in girders between structural steel stanchions of riveted or welded types.

The present invention was devised in order to obtain the advantages inherent in the use of reinforced concrete for beams and girders, and still retain the advantages inherent in the construction methods peculiar to the use of steel beams with steel stanchions built into a framework.

The advantages in the use of reinforced concrete for beams are mainly, that continuity may easily be obtained; that part of the floor slab is utilized to form a T-beam; and that, whereas in steel frame construction the fireproof casing of the steel beams is not able to be regarded as increasing the strength of the beam, in reinforced concrete construction the whole section is regarded as contributing to the beam strength.

The main advantages in the use of steel beam and stanchion construction are that the stanchion is kept to a conveniently small size and that the steel framework can be erected as a whole before any concreting is done on the job thus giving the advantage of speed in construction.

The present invention combines these advantages in that the framework can be built up independently of the concreting work, while, in the finished job, the beams are actually of reinforced concrete construction and are designed as such in the first place, and the stanchions, being of steel, are small in overall size.

A more specific object of the invention is to provide a beam comprising a plurality of longitudinal top members and a plurality of longitudinal bottom members all held together at a predetermined distance apart by means of stirrups wired and/or welded to both the top and bottom members, the longitudinal top members being straight throughout their length and the bottom members being either straight throughout their length, or some of the bottom members being straight throughout their length and others bent up at one or both ends.

One main object of this invention is to provide means whereby the stresses in the top and bottom members may be transferred to the stanchions into which they frame or between and to which they are secured.

An additional object of the invention is to provide a skeleton beam which will be simple and inexpensive to build up, light in weight, easy to install in position, which will constitute adequate reinforcement, when embedded in concrete, and which will in every respect be a general improvement in the art.

To the attainment of the foregoing and other objects and advantages, the invention preferably consists in the details of construction and the arrangement and combination of parts to be hereinafter more fully described and claimed, and illustrated in the accompanying drawings in which:

Figure 1 is a sectional perspective view illustrating one embodiment of the invention.

Figure 1*a* is a central vertical cross-section therethrough.

Referring more particularly to the drawings, the letter S designates the uprights, columns or stanchions between which is mounted any one of the skeleton beams shown in the various figures of the drawings and constituting my invention. In each instance the beam comprises rows of upper and lower longitudinally extending members *a* and *b*, respectively, bound together at spaced intervals by stirrups *d* which are not necessarily vertical though shown, but which are appropriately secured to the members—for instance wired and/or welded thereto as at *p*.

Figure 1:
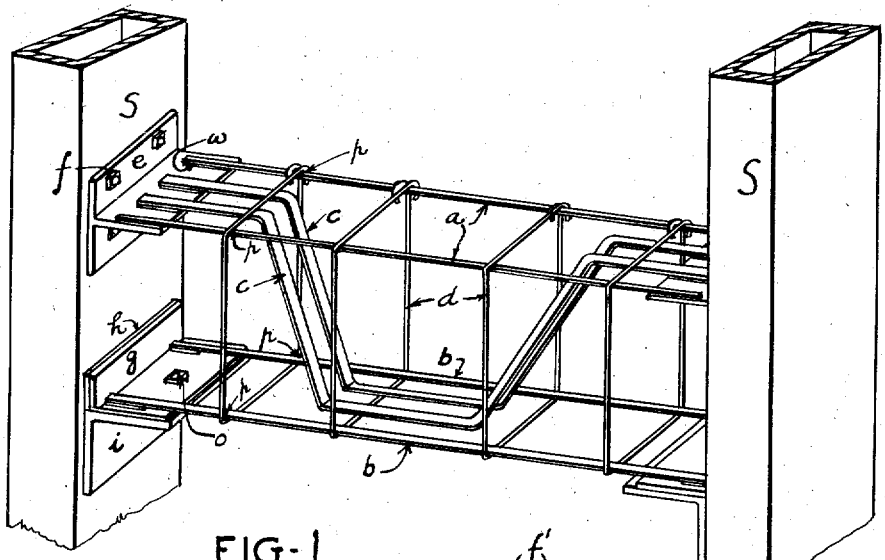
Figure 1A:
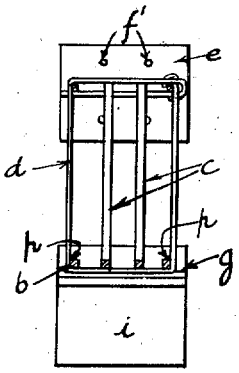

In the form of the invention shown in Figures 1 and 1*a*, I also make use of additional longitudinal members *c* which are of angular shape, their intermediate portions lying in the same plane with the lower members *b* and their ends lying in the same plane with the ends of the upper members *a*. The stirrups *d* are secured to the members *c* in the same manner as to *a* and *b*.

The ends of the upper members *a* and the ends of the angular members *c* are secured to transverse elements *e* of suitable cross-section. These elements are secured in the confronting faces of the stanchions as by bolts *f* passing through the side of the stanchions and through holes *f'* in the said elements. Alternately, the elements *e* may be welded to the stanchions. The ends of the members *a* and *c* are seated upon the elements *e* and welded thereto as shown at *w*. These elements *e* are provided for transferring the stresses in the members *a* and *c* to the stanchions.

The ends of the lower members *b* are provided with transverse elements *g* to which the ends of the members *b* are welded. These elements are mounted upon brackets *i* which are secured to the stanchions, a suitable number of bolts *o*, passing through holes *o'*, being provided for securing the angle elements *g* to the brackets *i*. The elements *g* take the compression stresses in the members *b* and transfer them to the stanchions either by direct bearing against the stanchions or through wedges or fillers *h* disposed between the elements *g* and the stanchions, as shown.

Figure 2:
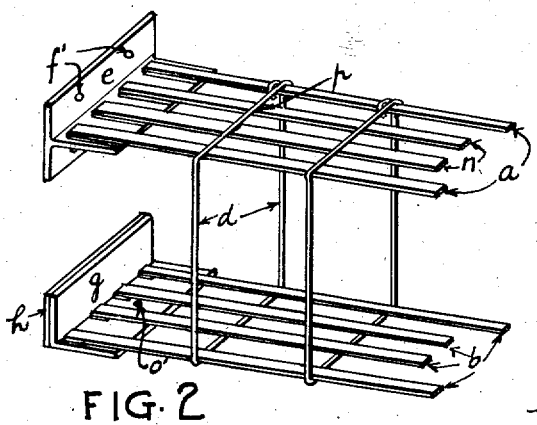
Figure 2 is a sectional or broken away perspective view illustrating a modification.

In Figure 2, the beam unit is of the type in which no bent bars are used. Relatively short longitudinal members *n* are placed in the top of the unit and these members are secured upon the respective elements *e* and to the stirrups *d*. These members *n* may be bent down into the bottom of the unit and run along for some distance parallel with the bottom members.

Figure 3:
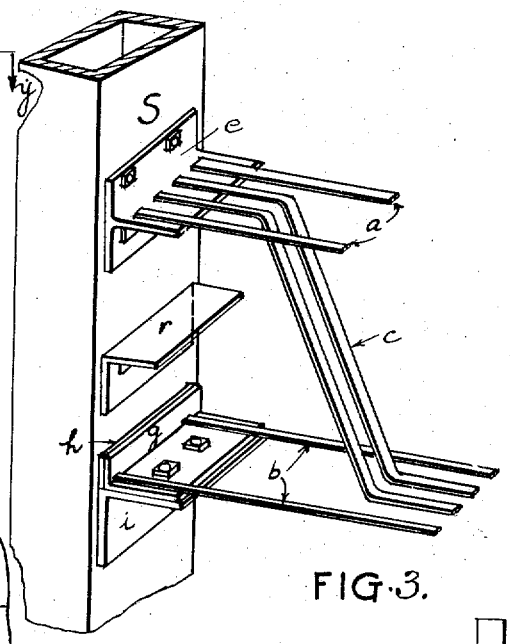
Figure 3 is a fragmentary perspective view illustrating one end of the first type of beam and with a slight variation in the vertical load sustaining means.

Figure 3 shows a structure identical with that in Figure 1 with the exception of the provision of an additional angle bracket *r* on each stanchion, this being a simple expedient I may resort to in cases where it is necessary to have additional means, for taking the vertical load of the composite beam, and it is conceivable that the lower bracket *i* might be insufficient because of the low value of concrete in bearing.

Figure 4:
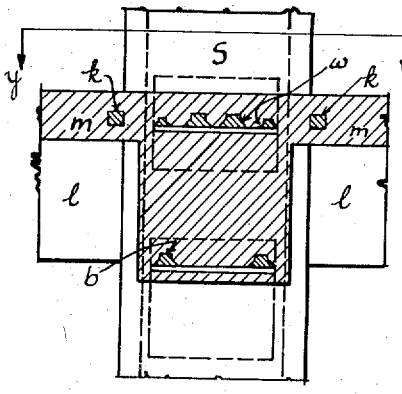
Figure 4 is a vertical sectional view showing the use of additional reinforcing means through the floor slab.
Figure 5:
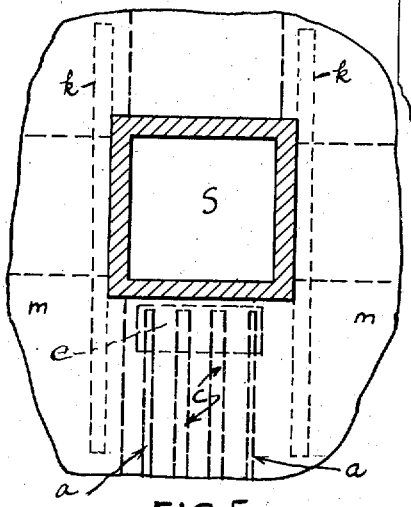
Figure 5 is a view looking down on what is shown in Figure 4, the view being taken on the line *y—y* thereof.

Figures 4 and 5 disclose an arrangement whereby extra tensile steel may be introduced by placing members *k* in the floor slab, at the sides of the stanchion, parallel to the longitudinal members of the unit. By this means, complete continuity can be obtained, where the steel fastened to the stanchion through *e* is insufficient for the purpose. Where stanchion S is an exterior stanchion, the members *k* can be bent into a U-shape about the stanchion, with the legs of the U forming the extra top steel required. *m* is the concrete floor slab. *l* are the cross beams framing into S.

Figure 6:
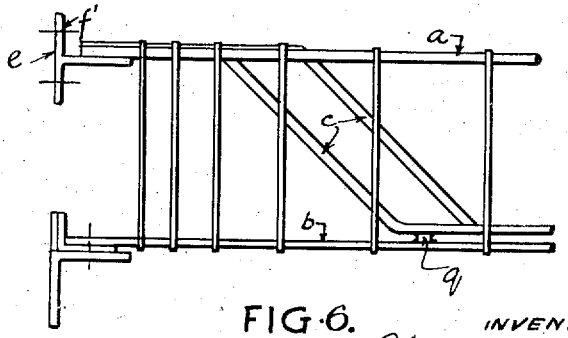
Figure 6 is a side elevation of one end portion of the beam of slightly modified form.

Figure 6 gives a side elevation of a unit, in which the bent members are in more than one plane and the bottom longitudinal members in more than one row. In this case, a separator *q* is used. This is welded to both rows of members.

Figure 8:
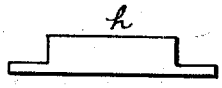
Figure 8 is an elevation of one convenient type of wedge or filler.
Figure 9:
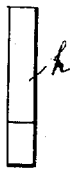
Figure 9 is an end elevation thereof.

In Figures 8 and 9, I have illustrated one type of wedge *h*, in which the ends are cut away, as shown, to leave small projections, which are bent around the sides of the stanchion to hold the wedge from the possibility of becoming loose.

Figure 10:
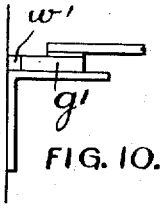
Figure 10 is a fragmentary detail view illustrating a different means for supporting the bottom members of the beam.
Figure 7:
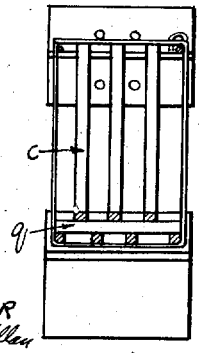
Figure 7 is a central cross sectional view taken vertically therethrough.

Figure 10 illustrates an alternative method of transferring the compression stresses in the bottom longitudinal members to the stanchion by welding the said bottom members to a section such as the flat, $g^1$, the stresses being transferred to the stanchion by the bead of welding $w^1$.

Figure 11:
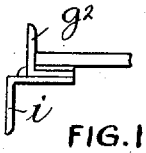
Figure 11 is a similar view showing still another variation.

Figure 11 discloses a further alternative method of transferring the compression stresses from the bottom longitudinal members to the stanchions in which the said bottom members are welded to a member such as the angle $g^2$, said member being welded to the bracket *i*.

The method of erection, with this type of structural unit, is the same as for an ordinary steel frame building. The fabricated beam is made with definite clearances as in steel construction. The beam is moved into position sideways on to the beam bracket, any rivets on the stanchion likely to interfere, being countersunk.

The bolts are then passed through the holes provided in the stanchions and screwed up. The wedges or filters are then driven into place behind the angle bar connected to the bottom longitudinal members, the beam being lifted up slightly in the centre by a hoist to facilitate the operation, if necessary. The wedges or fillers are then anchored, and the angle bars bolted to the stanchion brackets.

If the tensile strength, provided in the rivets or bolts connecting the transverse elements *e* to which the top members are welded is insufficient, such transverse elements can be welded to the stanchion at any later time.

From the foregoing descriptions and a study of the drawings, it will be apparent that I have thus provided a very simple and easily assembled and mounted skeleton beam which will be light in weight and which may be made with adequate reinforcement to carry the required load, when the concrete is poured to complete the composite unit. Particular attention might be invited to the provision of the wedge or filler members *h* which may be introduced between the angle bars *g* and the faces of the stanchions for the purpose of bringing about a thrust against the stanchions upon the application of load to the beam. The thickness of such fillers will of course depend upon circumstances and the very fact of their employment makes it impossible to make proper provision for carrying conditions.

While I have shown and described various preferred forms of the invention it should be understood that the right is reserved to make whatever changes constitute no departure from the spirit of the invention or the scope of the claims hereunto appended.

I claim:

1. In a building structure, upright stanchions, brackets secured upon the confronting sides thereof, and a skeleton beam unit disposed between the stanchions and including a plurality of longitudinal upper members, a plurality of longitudinal lower members, means embracing all of said members as a whole and located at intervals along the length thereof, transverse elements secured to the ends of the upper members and to the stanchions, transverse elements secured to the ends of the lower members and mounted upon the stanchion brackets, and means reacting against said lower transverse elements and the adjacent stanchions for transferring the compression stresses in the bottom longitudinal members.

2. In a building structure, upright stanchions, brackets secured upon the confronting sides thereof, and a skeleton beam unit disposed between the stanchions and including a plurality of longitudinal upper members, a plurality of longitudinal lower members, means embracing all of said members as a whole and located at intervals along the length thereof, transverse elements secured to the ends of the upper members and to the stanchions, transverse elements secured to the ends of the lower members and mounted upon the stanchion brackets, and filler members interposed between said lower transverse elements and the adjacent stanchions for transferring to the latter the compression stresses in the bottom longitudinal members.

3. In a building structure, upright stanchions, brackets secured upon the confronting sides thereof, and a skeleton beam unit disposed between the stanchions and including a plurality of longitudinal upper members, a plurality of longitudinal lower members, means embracing all of said members as a whole and located at intervals along the length thereof, transverse elements secured to the ends of the upper members and to the stanchions, transverse elements secured to the ends of the lower members and mounted upon the stanchion brackets, means reacting against said lower transverse elements and the adjacent stanchions for transferring the compression stresses in the bottom longitudinal members and additional longitudinal members located at the top of the beam and at the ends thereof and extending beyond the stanchions.

4. In a building structure, upright stanchions, brackets secured upon the confronting sides thereof, and a skeleton beam unit disposed between the stanchions and including a plurality of longitudinal upper members, a plurality of longitudinal lower members, means embracing all of said members as a whole and located at intervals along the length thereof, transverse elements secured to the ends of the upper members and to the stanchions, transverse elements secured to the ends of the lower members and mounted upon the stanchion brackets, means reacting against said lower transverse elements and the adjacent stanchions for transferring the compression stresses in the bottom longitudinal to the latter, and additional longitudinal members located at the top of the beam at the ends thereof and embracing the stanchions, said additional longitudinal members being connected by bight portions extending about the exterior stanchions.

ROBERT EDWARD McMILLAN.